(12) United States Patent
Cho et al.

(10) Patent No.: US 9,818,989 B2
(45) Date of Patent: Nov. 14, 2017

(54) RECHARGEABLE BATTERY AND MANUFACTURING METHOD THEREOF

(71) Applicant: SAMSUNG SDI CO., LTD., Yongin-si, Gyeonggi-do (KR)

(72) Inventors: Gibong Cho, Yongin-si (KR); Wonshik Park, Yongin-si (KR); Dongwoo Kim, Yongin-si (KR); Kyuho Kim, Yongin-si (KR); Jungki Min, Yongin-si (KR); Soonhak Hwang, Yongin-si (KR); Seunghwan Lee, Yongin-si (KR); Kyungtaek Choi, Yongin-si (KR); Sangjin Maeng, Yongin-si (KR); Jinuk Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 104 days.

(21) Appl. No.: 14/754,595

(22) Filed: Jun. 29, 2015

(65) Prior Publication Data

US 2016/0036009 A1 Feb. 4, 2016

(30) Foreign Application Priority Data

Jul. 30, 2014 (KR) .......................... 10-2014-0097369

(51) Int. Cl.
*H01M 2/02* (2006.01)
*H01M 2/30* (2006.01)
(Continued)

(52) U.S. Cl.
CPC ......... *H01M 2/021* (2013.01); *B23K 26/0622* (2015.10); *B23K 26/082* (2015.10);
(Continued)

(58) Field of Classification Search
None
See application file for complete search history.

(56) References Cited

U.S. PATENT DOCUMENTS 6,106,975 A * 8/2000 Watanabe ............... H01M 2/26
429/121
6,238,819 B1 * 5/2001 Cahill ................... B22F 3/1103
29/2

(Continued)

FOREIGN PATENT DOCUMENTS

JP   2001-219285 A   8/2001
JP   2012-156047 A   8/2012
(Continued)

OTHER PUBLICATIONS

English machine translation of Japanese Publication No. JP 2001-219285 A, dated Aug. 14, 2001, 14 pages.
(Continued)

*Primary Examiner* — Alix Eggerding
(74) *Attorney, Agent, or Firm* — Lewis Roca Rothgerber Christie LLP

(57) ABSTRACT

A rechargeable battery and a manufacturing method of the same are provided, which can aid in preventing an electric short from occurring between electrode plates by forming a cutting portion of each on the electrode plates in the shape of a curved surface or a bead having a uniform thickness and/or a diameter sufficient to prevent or substantially prevent the cutting portion from piercing a separator separating the electrode plates from each other. In a present embodiment, the electrode assembly includes an electrode plate having a current collector plate, a coating portion having an electrically active material coated on the current collector plate, a non-coating portion formed at an edge of the current collector plate and not coated with the electrically active material, a cutting portion inwardly formed from the non-coating portion, and a curved portion formed along the cutting portion in a thickness direction of the non-coating portion.

11 Claims, 15 Drawing Sheets
(7 of 15 Drawing Sheet(s) Filed in Color)

(51) Int. Cl.
- *B23K 26/32* (2014.01)
- *B23K 26/38* (2014.01)
- *B23K 26/40* (2014.01)
- *B23K 26/082* (2014.01)
- *B23K 26/0622* (2014.01)
- *B23K 26/244* (2014.01)
- *H01M 2/34* (2006.01)
- *H01M 4/04* (2006.01)
- *H01M 4/48* (2010.01)
- *H01M 4/66* (2006.01)
- *H01M 4/70* (2006.01)
- *B23K 101/36* (2006.01)
- *B23K 103/10* (2006.01)
- *B23K 103/12* (2006.01)

(52) U.S. Cl.
CPC ............ *B23K 26/244* (2015.10); *B23K 26/32* (2013.01); *B23K 26/38* (2013.01); *B23K 26/40* (2013.01); *H01M 2/30* (2013.01); *H01M 2/34* (2013.01); *H01M 4/0404* (2013.01); *H01M 4/48* (2013.01); *H01M 4/661* (2013.01); *H01M 4/664* (2013.01); *H01M 4/667* (2013.01); *H01M 4/70* (2013.01); *B23K 2201/36* (2013.01); *B23K 2203/10* (2013.01); *B23K 2203/12* (2013.01)

(56) References Cited

U.S. PATENT DOCUMENTS

| | | |
|---|---|---|
| 2005/0193551 A1 | 9/2005 | Zhang |
| 2010/0124694 A1* | 5/2010 | Hikata .................. B26F 1/384 |
| | | 429/94 |
| 2015/0102476 A1* | 4/2015 | Zhu .................. H01L 23/49541 |
| | | 257/676 |

FOREIGN PATENT DOCUMENTS

| | | |
|---|---|---|
| KR | 10-2006-0043312 A | 5/2006 |
| KR | 10-2008-0101725 A | 11/2008 |
| KR | 10-2013-0016516 A | 2/2013 |

OTHER PUBLICATIONS

English machine translation of Japanese Publication No. JP 2012-156047 A, dated Aug. 16, 2012, 23 pages.

\* cited by examiner

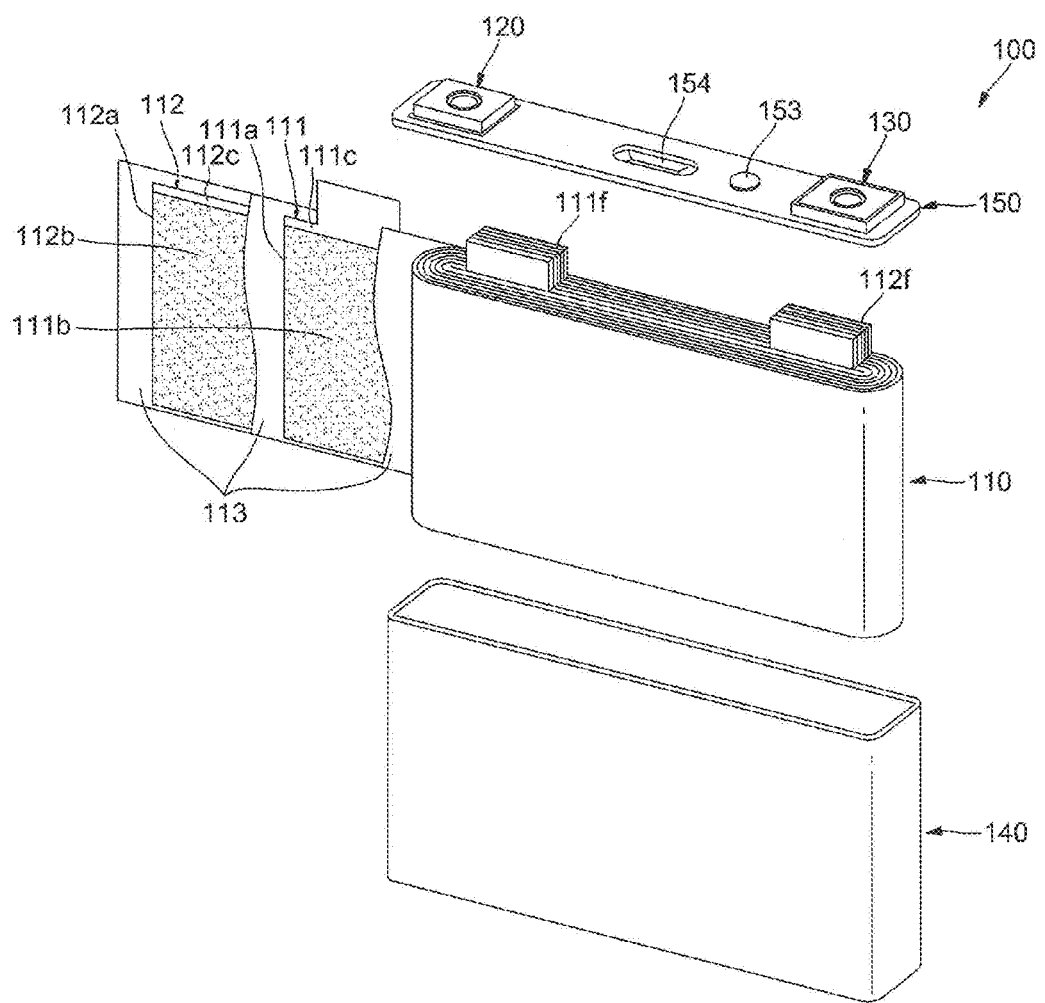

RECHARGEABLE BATTERY AND MANUFACTURING METHOD THEREOF

CROSS-REFERENCE TO RELATED APPLICATION

This application claims priority to and the benefit of Korean Patent Application No. 10-2014-0097369, filed on Jul. 30, 2014 in the Korean Intellectual Property Office, and all the benefits accruing therefrom under 35 U.S.C. 119, the content of which is herein incorporated by reference in its entirety.

BACKGROUND

1. Field

Aspects of the present invention relate to a rechargeable battery and a manufacturing method thereof.

2. Description of the Related Art

A rechargeable battery is a power storage system that converts electric energy into chemical energy and stores the same in a high energy density. Unlike primary batteries that are not designed to be recharged, secondary batteries that are rechargeable are widely used in IT devices, such as smart phones, cellular phones, notebook computers, tablet PCs, and so on. In addition, recently, due to an increase in oil prices, electric vehicles are drawing attention and there is an increasing tendency to use rechargeable batteries as power sources for electric vehicles. With such a trend, the secondary batteries need to provide characteristics such as high density, high capacity, high output, stability, and so on.

The rechargeable battery may be largely classified as a lead storage battery, a nickel-cadmium battery, a nickel hydrogen battery, a lithium ion battery, a lithium polymer battery, and so on. Among others, lithium ion batteries or lithium polymer batteries are rapidly being applied to portable IT devices owing to their advantages, including high operating voltages, high energy densities per unit weight, and so on.

Among various components of a rechargeable battery, an electrode plate should be cut accurately and adequately according to the size of a rechargeable battery to be manufactured to increase the capacity while reducing capacity dispersion, thereby increasing the quality of the rechargeable battery. In order to accurately cut the electrode plate, cutting or severing is generally performed using a mold.

However, frequent maintenance and repair of the mold should be done due to the limited life span of the mold, and the mold may be replaced according to a change in the product specification. Due to the frequent maintenance, repair and replacement of the mold, facility maintenance costs may be relatively high and the production quality may be low. In addition, from the viewpoint of quality, cutting quality may deteriorate as a cutting blade becomes blunt with repeated uses of the mold, so that a sharp burr may occur on the electrode plate. Therefore, repeatedly cutting electrode plates using the mold may make it difficult to maintain uniformity in cutting quality.

In particular, the likelihood that the burr would occur on the electrode plate depends highly on the state of mold used and mold setting clearance. A sharp burr of approximately (about) 15 µm or greater may pierce a separator having a thickness in a range of approximately (about) 20 µm to approximately (about) 30 µm, thus separating electrode plates from each other and resulting in an electric short between the electrode plates. In addition, since the burr is apt to be stripped off even by a slight shock, it may function as a metallic foreign material in a battery, thereby considerably degrading the quality of a rechargeable battery or battery cell.

SUMMARY

Embodiments of the present invention provide a rechargeable battery and a manufacturing method thereof, which can aid in preventing an electric short from occurring between electrode plates by forming a cutting portion on each of the electrode plates in the shape of a curved surface or a bead having a uniform thickness and/or a diameter sufficient to prevent or substantially prevent the cutting portion from piercing a separator separating the electrode plates from each other.

Embodiments of the present invention also provide a rechargeable battery and a manufacturing method thereof, which can prevent or substantially prevent a metallic foreign material from being generated by preventing or substantially preventing a cutting portion of an electrode plate from being stripped off from the electrode plate due to an external shock.

Embodiments of the present invention also provide a rechargeable battery and a manufacturing method thereof, which can aid in preventing an electric short from occurring between electrode plates even if the cutting portion pierces a separator by having a ceramic layer covering the cutting portion of each of the electrode plates, where the cutting portion is formed by laser beams to have the shape of a curved surface or a bead.

Embodiments of the present invention also provide a rechargeable battery and a manufacturing method thereof, where the cutting portion of the electrode plate is formed by cutting or severing the electrode plate using continuous wave laser beams, which can prevent or substantially prevent the cutting portion from being stripped off from the electrode plate, so that the cutting portion is in the shape of a curved surface or a bead having a uniform thickness and/or a diameter.

These and other features and aspects of the present invention will be described in or will be apparent from the following description of the example embodiments.

At least one of the above and other features and aspects may be realized by providing a rechargeable battery including a case, an electrode assembly positioned inside the case, and a terminal electrically connected to the electrode assembly and passing through the case, wherein the electrode assembly includes an electrode plate, the electrode plate includes a current collector plate, a coating portion having an electrically active material coated on the current collector plate, a non-coating portion formed at an edge of the current collector plate and not coated with the electrically active material, a cutting portion inwardly formed from the non-coating portion, and a curved portion formed along the cutting portion in a thickness direction of the non-coating portion.

The curved portion may have a circular or oval section perpendicular to a lengthwise direction of the cutting portion.

The cutting portion and the curved portion may each lie in a respective plane and may be shaped such that their respective planes are bent at least one time.

Each of the cutting portion and the curved portion may have a "∪" shaped plane.

The cutting portion may include a plurality of cutting portions spaced apart from each other, and a tab may outwardly extend from the non-coating portion between a pair of spaced-apart cutting portions among the plurality of cutting portions and may be electrically connected to the terminal.

The curved portion may be formed at opposite ends of the tab.

A thickness of the curved portion may be 1 to 4 times greater than a thickness of the current collector plate.

The curved portion may be covered by a ceramic layer.

At least one of the above and other features and aspects may be realized by providing a manufacturing method of a rechargeable battery, the manufacturing method including preparing an electrode plate including a current collector plate, a coating portion formed by coating an electrically active material on the current collector plate, and a non-coating portion formed at an edge of the current collector plate and is not coated with the electrically active material, and forming a cutting portion by irradiating continuous wave laser beams into the non-coating portion to form a curved portion along the cutting portion in a thickness direction of the non-coating portion.

When the current collector plate is made of aluminum or an aluminum alloy, the continuous wave laser beams may have energy ranging from 19 cal/s to 119 cal/s and a moving speed ranging from 100 mm/s to 5000 mm/s, and when the current collector plate is made of copper or a copper alloy, the continuous wave laser beams may have energy ranging from 47 cal/s to 143 cal/s and a moving speed ranging from 100 mm/s to 9000 mm/s.

As described above, the embodiments of the present invention provide a rechargeable battery and a manufacturing method thereof, which can aid in preventing an electric short from occurring between electrode plates by forming a cutting portion on each of the electrode plates in the shape of a curved surface or a bead having a uniform thickness and/or a diameter in order to prevent or substantially prevent the cutting portion from piercing a separator separating the electrode plates from each other. That is to say, since the cutting portion formed after the cutting or severing of the electrode plate is shaped to have a gently curved surface, such as a circle or an ellipse, rather than a sharp, keen-edged burr, the separator is not damaged by the cutting portion, thereby preventing or substantially preventing an electric short from occurring between electrode plates stacked one on another with the separator interposed therebetween.

In addition, the embodiments of the present invention provide a rechargeable battery and a manufacturing method thereof, which can prevent or substantially prevent a metallic foreign material from being generated by preventing or substantially preventing a cutting portion of an electrode plate from being stripped off from the electrode plate due to an external shock. That is to say, since the cutting portion of the electrode plate is fused and naturally cooled, a connection or junction area between the electrode plate and the cutting portion is increased, thereby preventing or substantially preventing the cutting portion from being easily stripped off from the electrode plate even if an external shock is applied to the rechargeable battery. Therefore, the cutting portion may not function as a metallic foreign material in the rechargeable battery.

Further, the embodiments of the present invention provide a rechargeable battery and a manufacturing method thereof, which can aid in preventing an electric short from occurring between electrode plates even if the cutting portion pierces a separator by having a ceramic layer covering the cutting portion of each of the electrode plates, where the cutting portion is formed by laser beams so that the cutting portion has the shape of a curved surface or the shape of a bead. That is to say, since the cutting portion that is shaped to have a curved surface or the shape of a bead is surrounded (e.g., perfectly surrounded) by the ceramic layer, it is possible to prevent or substantially prevent an electric short between the electrode plates even if the cutting portion pierces the separator because of the insulating properties of the ceramic layer.

Additionally, the embodiments of the present invention provide a rechargeable battery and a manufacturing method thereof, which has a cutting portion of an electrode plate in the shape of a curved surface or a bead having a uniform thickness and/or a diameter formed by cutting or severing the electrode plate using continuous wave laser beams, which can prevent or substantially prevent the cutting portion from being stripped off from the electrode plate. That is to say, since continuous laser beams having uniform energy, rather than pulsed wave laser beams prone to a sharp, keen-edged burr, are used, the cutting portion of the electrode plate is formed to have a curved portion having a circular shape, instead of the sharp, keen-edged burr, thereby preventing or substantially preventing the separator from being damaged and preventing or substantially preventing the cutting portion from being easily stripped off from the electrode plate.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other features and aspects of the present invention will become more apparent by describing in detail example embodiments thereof with reference to the attached drawings in which:

FIG. 3 is an exploded perspective view of the rechargeable battery illustrated in FIG. 1;

DETAILED DESCRIPTION

Figure 1:
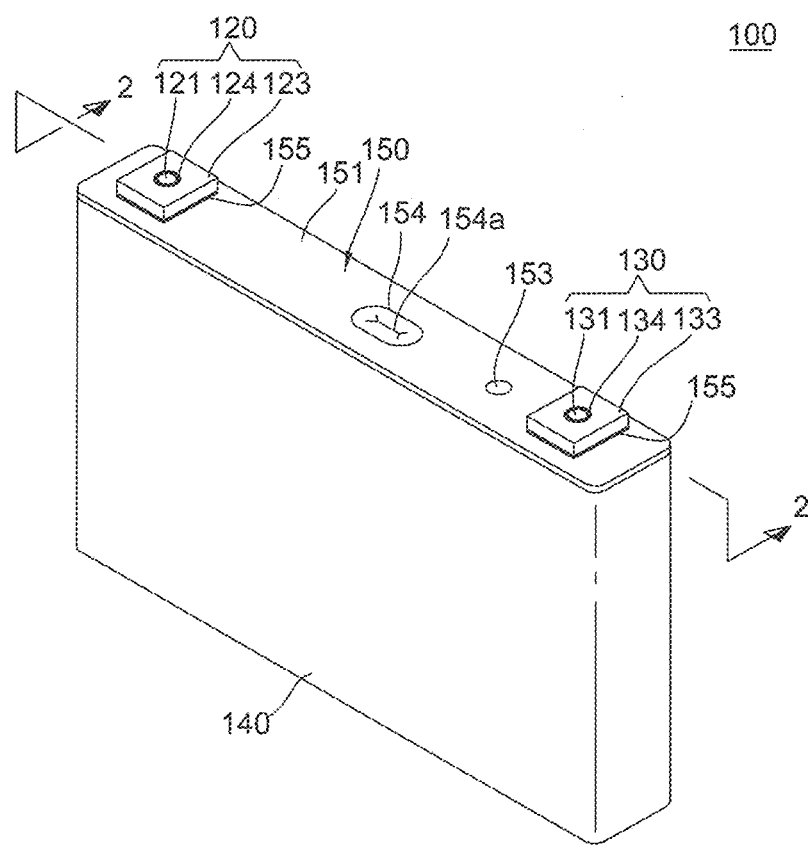
FIG. 1 is a perspective view of a rechargeable battery according to an embodiment of the present invention.

Aspects and features of the present invention and methods of accomplishing the same may be understood more readily by reference to the following detailed description of example embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

In the drawings, the size and relative sizes of layers and regions may be exaggerated for clarity. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention. Also, when a first element is described as being "coupled to" or "connected to" a second element, the first element may be directly "coupled to" or "connected to" the second element, or indirectly "coupled to" or "connected to" the second element with one or more elements may be interposed therebetween.

It will be understood that the term "tab" used herein is a concept encompassing "positive electrode tab" and/or "negative electrode tab." The positive electrode tab may outwardly extend directly from a positive electrode current collector plate of a positive electrode plate and the negative electrode tab may outwardly extend directly from a negative electrode current collector plate of a negative electrode plate. In addition, the positive electrode tab may be separately welded to the positive electrode current collector plate of the positive electrode plate to then outwardly extend (e.g., extend a predetermined length) and the negative electrode tab may be separately welded to the negative electrode current collector plate of the negative electrode plate to then outwardly extend (e.g., extend a predetermined length). As described above, since the term "tab" has complex meanings, it should not be construed to have only one of the above-stated meanings.

Figure 2:
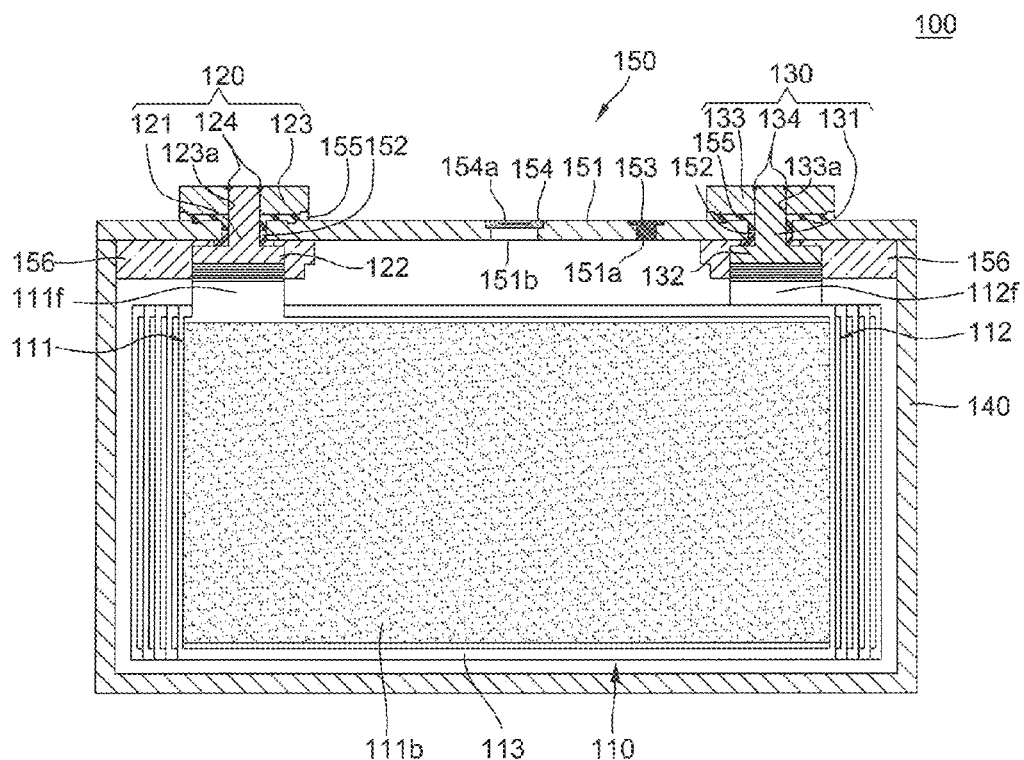
FIG. 2 is a cross-sectional view of the rechargeable battery, taken along the line 2-2 of FIG. 1.

FIG. 1 is a perspective view of a rechargeable battery according to an embodiment of the present invention, FIG. 2 is a cross-sectional view of the rechargeable battery, taken along the line 2-2 of FIG. 1 and FIG. 3 is an exploded perspective view of the rechargeable battery illustrated in FIG. 1.

As illustrated in FIGS. 1 to 3, the rechargeable battery 100 according to this embodiment of the present invention includes an electrode assembly 110, a first terminal 120, a second terminal 130, a case 140 and a cap assembly 150.

The electrode assembly 110 includes a wound or laminated stacked structure having a first electrode plate 111, a separator 113, and a second electrode plate 112, and, may be a thin plate or a thin foil shape. In this embodiment, the first electrode plate 111 may be a positive electrode and the second electrode plate 112 may be a negative electrode, and vice versa.

The first electrode plate 111 includes a first current collector plate 111a formed of a metal foil or mesh made of aluminum or an aluminum alloy, a first coating portion 111b formed by coating a first electrically active material, such as a transition metal oxide, on the first current collector plate 111a, a first non-coating portion 111c on which the first electrically active material is not coated, a first cutting portion (111d of FIGS. 4A and 4B) inwardly formed from the first non-coating portion 111c, a first curved portion (111e of FIGS. 4A and 4B) formed along the first cutting portion 111d in a thickness direction of the first non-coating portion 111c, and a first tab 111f outwardly extending from the first non-coating portion 111c and electrically connected to the first terminal 120.

Here, the first tab 111f may function as a passage for current flowing between the first electrode plate 111 and the first terminal 120. The first cutting portion 111d, the first curved portion 111e and the first tab 111f of the first electrode plate 111 will be below described in more detail with reference to other drawings.

The second electrode plate 112 includes a second current collector plate 112a formed of a metal foil or mesh made of copper, a copper alloy, nickel or a nickel alloy, a second coating portion 112b formed by coating a second electrically active material, such as a transition metal oxide, on the second current collector plate 112a, a second non-coating portion 112c on which the second electrically active material is not coated, a second cutting portion inwardly formed from the second non-coating portion 112c, a second curved portion formed along the second cutting portion in a thickness direction of the second non-coating portion 112c, and a second tab 112f outwardly extending from the second non-coating portion 112c and electrically connected to the second terminal 130.

Here, the second tab 112f may function as a passage for current flowing between the second electrode plate 112 and the second terminal 130. In addition, since external shapes of the second non-coating portion 112c, the second cutting portion, the second curved portion and the second tab 112f are substantially the same as those of the first non-coating portion 111c, the first cutting portion 111d, the first curved portion 111e and the second tab 112f, respectively, detailed descriptions thereof will not be given.

In other embodiments, polarities of the first and second electrode plates 111 and 112 may differ from what is described above.

The separator 113 may be positioned between the first electrode plate 111 and the second electrode plate 112 to prevent or substantially prevent electrical short circuits and to allow movement of lithium ions. The separator 113 according to this embodiment may be made of a material selected from the group consisting of polyethylene, polypropylene, or a copolymer of polypropylene and polyethylene. The present invention is not limited to the material of the separator 113 listed herein.

Meanwhile, a winding axis of the electrode assembly 110 may be substantially parallel or horizontal with a terminal axis of the first terminal 120 and a terminal axis of the second terminal 130. Here, the winding axis or the terminal axis refers to a vertical axis illustrated in FIGS. 2 and 3, and it will be understood that when a winding axis is referred to as being substantially parallel or horizontal with a terminal axis, the winding axis and the terminal axis may not meet each other even when they are elongated or may meet each other only when they are elongated very far.

In addition, as described above, the first tab 111f is interposed between the electrode assembly 110 and the first terminal 120 and the second tab 112f is interposed between the electrode assembly 110 and the second terminal 130. That is to say, the first tab 111f extends from a top end of the electrode assembly 110 to the first terminal 120 to then be connected or welded thereto. In addition, the second tab 112f extends from the top end of the electrode assembly 110 to the second terminal 130 to then be connected or welded thereto.

As described above, the first tab 111f may be a portion of the first electrode plate 111, that is, the first non-coating portion 111c itself, where the first active material is not coated, or a separate member connected to the first non-coating portion 111c. Here, the separate member may include one selected from the group consisting of aluminum, an aluminum alloy, nickel, a nickel alloy, copper, a copper alloy and equivalents thereof.

In addition, the second tab 112f may be a portion of the second electrode plate 112, that is, the second non-coating portion 112c itself, where the second active material is not applied, or a separate member connected to the second non-coating portion 112c. Here, the separate member may include one selected from the group consisting of nickel, a nickel alloy, copper, a copper alloy, aluminum, an aluminum alloy, and equivalents thereof.

As described above, the winding axis of the electrode assembly 110 and the terminal axis of each of the first and second terminals 120 and 130 are formed to be substantially parallel or horizontal with each other, and an electrolyte injection direction and a winding axis direction are also formed to be substantially parallel or horizontal with each other. Therefore, when the electrolyte is injected, the electrode assembly 110 demonstrates high electrolyte impregnating efficiency. In addition, when over-charging occurs in the rechargeable battery 100, internal gases of the electrode assembly 110 may rapidly move toward a safety vent 154, thereby facilitating the operation of the safety vent 154.

In addition, since the tabs 111f and 112f (non-coating portions or separate members) of the electrode assembly 110 are directly electrically connected to the terminals 120 and 130 to have shortened electric passages, internal resistance of the rechargeable battery 100 may be reduced and the number of components may also be reduced.

The electrode assembly 110 is accommodated in the case 140 along with an electrolyte. The electrolyte may include an organic solvent, such as EC (ethylene carbonate), PC (propylene carbonate), DEC (diethyl carbonate), EMC (ethyl methyl carbonate), or DMC (dimethyl carbonate), and a lithium salt, such as lithium hexafluorophosphate ($LiPF_6$) or lithium tetrafluoroborate ($LiBF_4$). In addition, the electrolyte may be in a liquid, solid, or gel phase.

The first terminal 120 is made of a metal and is electrically connected to the first electrode plate 111. The first terminal 120 includes a first terminal pillar 121, a first flange 122 and a first terminal plate 123.

The first terminal pillar 121 is integrally formed with the first flange 122 and upwardly protrudes and extends (e.g., extends a predetermined length) while passing through a cap plate 151 (to be described later) to then be electrically connected to the first tab 111f below the cap plate 151. That is to say, a relatively wide first flange 122 is formed at a bottom end of the first terminal pillar 121 to prevent or substantially prevent the first terminal pillar 121 from being dislodged from the cap plate 151, and the first tab 111f is electrically connected to the first flange 122.

The first terminal pillar 121 and the first flange 122 are made of aluminum or an aluminum alloy, so that the first tab 111f made of aluminum or an aluminum alloy is easily electrically/mechanically connected to the first flange 122.

The first terminal plate 123 is positioned on the cap plate 151 and has a hole 123a formed therein. In addition, the first terminal pillar 121 is coupled and welded to the hole 123a. For example, laser beams are provided to boundary areas of the upwardly exposed first terminal pillar 121 and the first terminal plate 123, so that the boundary areas are fused and then cooled to then be welded to each other. The welded areas are denoted by reference numeral 124 in FIG. 3.

In addition, the first terminal plate 123 is electrically connected to the cap plate 151, and the cap plate 151 (to be described later) and the case 140 may have the same polarity with the first terminal 120 (e.g., positive polarity).

The second terminal 130 is made of a metal and is electrically connected to the second electrode plate 112. The second terminal 130 may include a second terminal pillar 131, a second flange 132 and a second terminal plate 133.

The second terminal pillar 131 is integrally formed with the second flange 132 and upwardly protrudes and extends (e.g., extends a predetermined length) while passing through a cap plate 151 (to be described later) to then be electrically connected to the second tab 112f below the cap plate 151. That is to say, a relatively wide second flange 132 is formed at a bottom end of the second terminal pillar 131 to prevent or substantially prevent the second terminal pillar 131 from being dislodged from the cap plate 151, and the second tab 112f is electrically connected to the second flange 132.

The second terminal pillar 131 and the second flange 132 are made of copper or a copper alloy, so that the second tab 112f made of copper, a copper alloy, nickel or a nickel alloy is easily electrically/mechanically connected to the second flange 132.

The second terminal plate 133 is also positioned on the cap plate 151 and has a hole 133a formed therein. In addition, the second terminal pillar 131 is coupled and welded to the hole 133a. For example, laser beams are provided to boundary areas of the upwardly exposed second terminal pillar 131 and the second terminal plate 133, so that the boundary areas are fused and then cooled to then be welded to each other. The welded areas are denoted by reference numeral 134 in FIG. 3.

The case 140 is made of a conductive metal, such as aluminum, an aluminum alloy or nickel plated steel, and may have a hexahedron shape or another shape capable of housing the electrode assembly 110, the first terminal 120 and the second terminal 130 in an inner space thereof. In FIG. 2, since the rechargeable battery 100 is illustrated with the case 140 and the cap assembly 150 assembled with each other, an opening is not shown; however, the rechargeable battery 100 can be substantially opened via a top portion of the cap assembly 150. Meanwhile, the inner surface of the case 140 is subjected to an insulation treatment to be insulated from the electrode assembly 110, the first terminal 120, the second terminal 130 and the cap assembly 150.

The cap assembly 150 is coupled to the case 140. In detail, the cap assembly 150 includes a cap plate 151, a seal gasket 152, a plug 153, the safety vent 154, an upper insulation member 155 and a lower insulation member 156.

The cap plate 151 seals the opening of the case 140 and is made of the same or substantially the same material as the case 140. For example, the cap plate 151 may be coupled to the case 140 by laser welding. Here, since the cap plate 151 has the same polarity with the first terminal 120, as described above, the cap plate 151 and the case 140 may have the same polarity.

The seal gasket 152, made of an insulating material, is formed between each of the first terminal pillar 121 and the second terminal pillar 131 and the cap plate 151 to seal portions between each of the first terminal pillar 121 and the second terminal pillar 131 and the cap plate 151. The seal gasket 152 may prevent or substantially prevent external moisture from infiltrating into the rechargeable battery 100 or the electrolyte accommodated within the rechargeable battery 100 from flowing out from the rechargeable battery 100.

The plug 153 seals the electrolyte injection hole 151a of the cap plate 151, and the safety vent 154 is installed in a vent hole 151b of the cap plate 151 and has a notch 154a configured to be opened at a preset pressure.

The upper insulation member 155 is positioned between each of the first terminal pillar 121 and the second terminal pillar 131 and the cap plate 151. In addition, the upper insulation member 155 makes close contact with the cap plate 151. Further, the upper insulation member 155 insulates each of the first terminal pillar 121 and the second terminal pillar 131 from the cap plate 151.

The lower insulation member 156 is formed between the electrode assembly 110 and the cap plate 151 and prevents or substantially prevents short circuits from occurring. That is to say, the lower insulation member 156 prevents or substantially prevents a short circuit between the first current collector plate 111a and the cap plate 151 and/or a short circuit between the second current collector plate 112a and the cap plate 151.

Figure 4A:
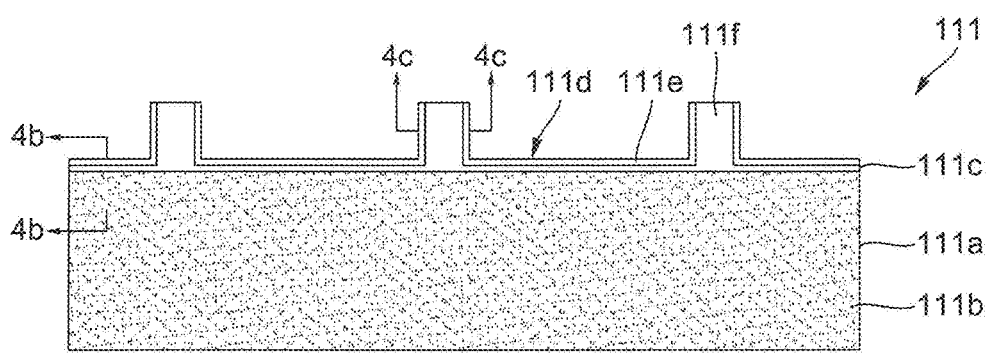
FIG. 4A is a plan view illustrating a portion of an electrode plate of the rechargeable battery illustrated in FIG. 1.
Figure 4B:
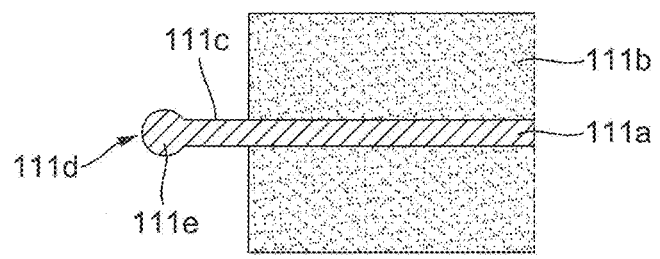
FIG. 4B is a cross-sectional view taken along the line 4b-4b of FIG. 4A.
Figure 4C:
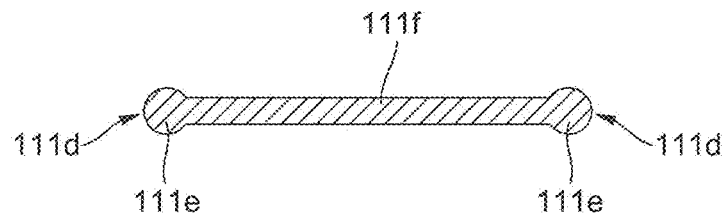
FIG. 4C is a cross-sectional view taken along the line 4c-4c of FIG. 4A.

FIG. 4A is a plan view illustrating a portion of an electrode plate of the rechargeable battery illustrated in FIG. 1, FIG. 4B is a cross-sectional view taken along the line 4b-4b of FIG. 4A, and FIG. 4C is a cross-sectional view taken along the line 4c-4c of FIG. 4A. In an exemplary embodiment, the electrode plate may be the positive electrode plate, but all the features described herein may also apply to the negative electrode plate.

As illustrated in FIGS. 4A to 4C, the electrode plate 111 includes the current collector plate 111a, the coating portion 111b formed by coating an electrically active material on the current collector plate 111a, the non-coating portion 111c formed at an edge of the current collector plate 111a and not coated with the electrically active material, the cutting portion 111d inwardly formed from the non-coating portion 111c, the tab 111f formed between two portions of the cutting portion 111d and electrically connected to a terminal, and the curved portion 111e formed along the cutting portion 111d and the tab 111f in a thickness direction of the non-coating portion 111c.

The current collector plate 111a has a foil or mesh shape, and may be made of one selected from the group consisting of aluminum, an aluminum alloy, copper, a copper alloy, nickel, a nickel alloy and equivalents thereof, as described above. However, the present invention is not limited to the material of the current collector plate 111a listed herein. The current collector plate 111a may have a thickness ranging from approximately (about) 6 μm to approximately (about) 12 μm. If the thickness of the current collector plate 111a is smaller than 6 μm, winding, unwinding or carrying may be difficult to achieve during the battery manufacturing process, and the current collector plate 111a may likely be torn or damaged due to an external shock. If the thickness of the current collector plate 111a is greater than 12 μm, the battery thickness may be increased without further increasing current collecting efficiency.

The coating portion 111b has a considerably greater thickness than the current collector plate 111a and may be made of one electrically active material selected from the group consisting of transition metal oxide, graphite, carbon and equivalents thereof. However, the present invention is not limited to the material of the coating portion 111b listed herein. The coating portion 111b may have a thickness of approximately (about) 40 μm to approximately (about) 60 μm from a surface of the current collector plate 111a. If the thickness of the coating portion 111b is smaller than 40 μm, it is difficult to achieve a desired battery capacity. In addition, if the thickness of the coating portion 111b is greater than 60 μm, the battery thickness may be increased without further increasing battery capacity. In addition, since the coating portion 111b is formed on both surfaces of the current collector plate 111a, the overall thickness of the coating portion 111b may be in a range of approximately (about) 80 μm to approximately (about) 120 μm.

The non-coating portion 111c is a region on which the electrically active material is not coated and the current collector plate 111a is directly exposed to the outside. The non-coating portion 111c is formed at the edge of the electrode plate 111. In addition, the non-coating portion 111c may have a region other than the tab 111f, the region having a width ranging from approximately (about) 0.1 mm to approximately (about) 10 mm. If the width of the non-coating portion 111c is smaller than 0.1 mm, which is smaller than a tolerance of roll-to-roll equipment for laser cutting, there is a risk of cutting the coating portion 111b during laser cutting or severing. If the coating portion 111b is cut by laser beams, the electrically active material (ceramic) forming the coating portion 111b may be scattered in particle forms, so that contamination of the roll-to-roll equipment may become aggravated and the reliability of the rechargeable battery 100 may also be lowered. In addition, if the width of the non-coating portion 111c is greater than 10 mm, an area of the non-coating portion 111c may become unnecessarily increased and the battery capacity may be relatively reduced.

When viewed from a plane, the cutting portion 111d is recessed (e.g., recessed a predetermined depth) inwardly from the non-coating portion 111c. As will later be described again, the cutting portion 111d is a line produced by cutting a region (e.g., a predetermined region) of the non-coating portion 111c by continuous wave laser beams. The cutting portion 111d may include a plurality of cutting portions spaced apart from each other.

The tab 111f is a region outwardly extending from the non-coating portion 111c between a pair of spaced-apart cutting portions 111d among the plurality of cutting portions 111d and is electrically connected to the terminal. The tab 111f may have a length ranging from approximately (about) 5 mm to approximately (about) 30 mm. If the length of the tab 111f is smaller than 5 mm, it is difficult to electrically connect the plurality of tabs 111f to the terminal. If the length of the tab 111f is greater than 30 mm, a passage for the flow of current becomes relatively increased, thereby increasing electric resistance.

The curved portion 111e is formed along edges of the cutting portion 111d and the tab 111f in a thickness direction of the non-coating portion 111c and in a direction perpendicular to the thickness direction of the non-coating portion 111c. In detail, the curved portion 111e may be a kind of dross formed by fusing the non-coating portion 111c when the cutting portion 111d is formed by applying continuous wave laser beams to the non-coating portion 111c. As described above, since the curved portion 111e is formed by fusing the non-coating portion 111c (that is, the current collector plate 111a itself) by the continuous wave laser beams and then being cooled, a cross-sectional shape of the curved portion 111e may be roughly circular due to surface tension. That is to say, the curved portion 111e may have a roughly circular and/or oval cross-section perpendicular to a lengthwise direction of the cutting portion 111d (that is, the current collector plate 111a). Here, the curved portion 111e may be perfectly circular, as illustrated in FIGS. 4B and 4C. However, the curved portion 111e may also be shaped of a distorted circle or distorted oval due to characteristics of the manufacturing process. In addition, the curved portion 111e may be a curved surface, such as a circular surface or an oval surface, but the present invention is not limited to the shape of the curved portion 111e listed herein.

Since the curved portion 111e is formed by fusing the non-coating portion 111c and naturally cooling the same, the curved portion 111e may have a round surface having a curvature (e.g., a predetermined curvature). In other words, as described above, the curved portion 111e according to this embodiment is formed by surface tension such that the non-coating portion 111c is instantaneously fused using the heat from the continuous wave laser beams and then cooled. The curved portion 111e may have a roughly circular and/or oval surface having a curvature (e.g., a predetermined curvature).

Meanwhile, when viewed from a plane, the cutting portion 111d and the curved portion 111e are shaped such that their planes are bent at least one time. In other words, each of the cutting portion 111d and the curved portion 111e has a "U" shaped plane, but the present invention is not limited to the shapes of the cutting portion 111d and the curved portion 111e listed herein. Here, the curved portion 111e may be formed at opposite ends of the tab 111f and may not be formed at a top end of the tab 111f. The curved portion 111e may be formed at a top end of the tab 111f as well as at opposite ends of the tab 111f.

In addition, the thickness of the curved portion 111e may be 1 to 4 times of the thickness of the current collector plate 111a (that is, the non-coating portion 111c). The smaller the thickness of the curved portion 111e, the better the battery reliability is. However, due to characteristics of the manufacturing process, it is difficult to make the thickness of the curved portion 111e smaller than the thickness of the current collector plate 111a. However, it is possible to make the thickness of the curved portion 111e smaller than approximately (about) 4 times of the thickness of the current collector plate 111a by adjusting the energy intensity and moving speed of laser beams. As described above, the thickness of the curved portion 111e means not only a thickness in a thickness direction of the current collector plate 111a but also a thickness in a direction perpendicular to the thickness direction of the current collector plate 111a.

In more detail, the thickness by which the curved portion 111e exceeds the thickness of the non-coating portion 111c may be in a range of approximately (about) 0 μm to approximately (about) 100 μm, preferably in a range of approximately (about) 15 μm to approximately (about) 35 μm, and more preferably in a range of approximately (about) 20 μm to approximately (about) 30 μm. As described above, the smaller the thickness of the curved portion 111e is, the better the battery reliability is. However, due to characteristics of the manufacturing process, it is difficult to make the thickness of the curved portion 111e to be about 0 μm. However, it is possible to make the thickness of the curved portion 111e smaller than approximately (about) 100 μm by adjusting the energy intensity and moving speed of laser beams.

In addition, the thickness of the curved portion 111e may be 0.1 to 0.8 times of the thickness of the coating portion 111b. Here, the thickness of the coating portion 111b may mean the overall thickness of the coating portion 111a formed on both surfaces of the current collector plate 111a.

As described above, due to characteristics of the manufacturing process, it is difficult to make the thickness of the curved portion 111e smaller than 0.1 times of the thickness of the coating portion 111b. However, it is possible to make the thickness of the curved portion 111e smaller than approximately (about) 0.8 times of the thickness of the coating portion 111b by adjusting the energy intensity and moving speed of laser beams.

In addition, the thickness of the curved portion 111e may be 0.001 to 1.1 times greater than the width of the non-coating portion 111c. If the thickness of the curved portion 111e is less than 0.001 times greater than the width of the non-coating portion 111c, it is difficult to achieve laser cutting due to limitation of the roll-to-roll equipment. If the thickness of the curved portion 111e is 1.1 times greater than the width of the non-coating portion 111c, there is a risk of cutting the coating portion 111b during laser cutting or severing due to the tolerances of the roll-to-roll equipment for laser cutting. As described above, if the coating portion 111b is cut by laser beams, the electrically active material (ceramic) forming the coating portion 111b may be scattered in particle forms, so that contamination of the roll-to-roll equipment may become severe and the reliability of the rechargeable battery 100 may also be lowered.

In the present embodiment, the cutting portion 111d of the electrode plate 111, that is, the curved portion 111e, is formed in a circle, an oval or a welding bead having a uniform thickness and/or diameter, the curved portion 111e of the electrode plate 111 may not pierce a separator separating the electrode plates 111 from each other, thereby preventing or substantially preventing an electric short from occurring. In addition, since the curved portion 111e has a roughly round surface, the curved portion 111e may prevent or substantially prevent the separator from being torn or damaged even if the curved portion 111e is brought into direct contact with the separator.

In addition, in the present embodiment, since the cutting portion 111d of the electrode plate 111, that is, the curved portion 111e, is formed by fusing the current collector plate 111a and then being cooled while being subjected to surface tension, a junction area of the current collector plate 111a itself and the curved portion 111e is relatively large. Accordingly, the curved portion 111e is not easily stripped off from the current collector plate 111a due to an external shock and a metallic foreign material is not produced in the electrode assembly 110.

Figure 5A:
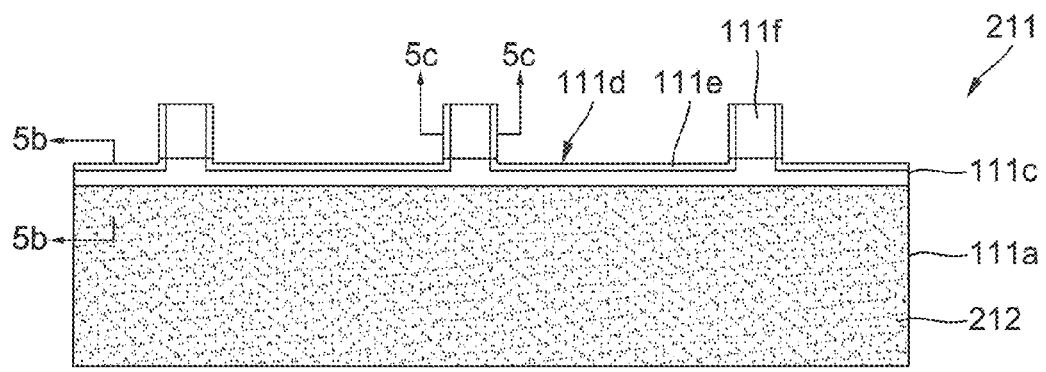
FIG. 5A is a plan view illustrating a portion of an electrode plate of a rechargeable battery according to another embodiment of the present invention.
Figure 5B:
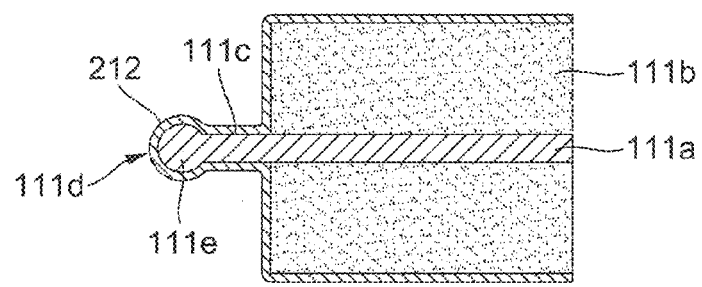
FIG. 5B is a cross-sectional view taken along the line 5b-5b of FIG. 5A.
Figure 5C:
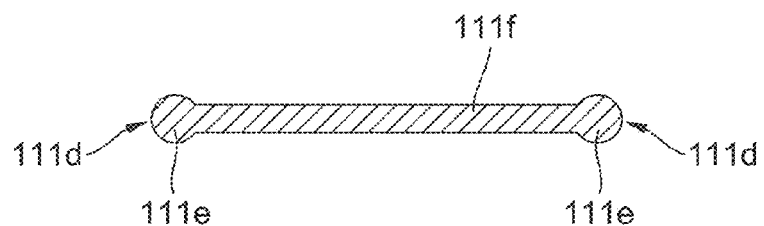
FIG. 5C is a cross-sectional view taken along the line 5c-5c of FIG. 5A.

FIG. 5A is a plan view illustrating a portion of an electrode plate of a rechargeable battery according to another embodiment of the present invention, FIG. 5B is a cross-sectional view taken along the line 5b-5b of FIG. 5A, and FIG. 5C is a cross-sectional view taken along the line 5c-5c of FIG. 5A.

As illustrated in FIGS. 5A to 5C, the electrode plate 211 includes the current collector plate 111a, the coating portion 111b formed by coating an active material on the current collector plate 111a, the non-coating portion 111c formed at the edge of the current collector plate 111a and not coated with the active material, the tab 111f formed between the cutting portion 111d and another cutting portion 111d and electrically connected to a terminal, the curved portion 111e formed along the cutting portion 111d and the tab 111f in a thickness direction of the non-coating portion 111c, and a ceramic layer 212 covering the coating portion 111b, the non-coating portion 111c, the cutting portion 111d and the curved portion 111e.

In particular, the ceramic layer 212 is formed to cover not only the coating portion 111b and the non-coating portion 111c but also the curved portion 111e formed in the cutting portion 111d, thereby preventing or substantially preventing the curved portion 111e made of a metallic material from being exposed to the outside and preventing or substantially preventing an electric short between a positive electrode plate and a negative electrode plate from occurring even if the curved portion 111e pierces a separator. However, the ceramic layer 212 is not formed on the tab 111f and the curved portions 111e formed at opposite sides of the tab 111f, thereby allowing the tab 111f to be easily electrically connected to the terminal.

The ceramic layer 212 is previously formed on the coating portion 111b and the non-coating portion 111c before a laser cutting operation, and is cut at the same time as the laser cutting operation is performed on the non-coating portion 111c. Here, the newly formed curved portion 111e is perfectly covered by the existing ceramic layer 212.

Although the unexpected mechanism in which the curved portion 111e is perfectly covered by the ceramic layer 212 during the laser cutting operation was not thoroughly investigated by inventors of the present invention, the curved portion 111e is presumably covered by the ceramic layer 212 through the following mechanism. That is to say, since the metallic non-coating portion 111c has a melting point in a range of approximately (about) 600° C. to approximately (about) 1000° C. and a melting point of the ceramic layer 212 is generally much higher than 2000° C., the ceramic layer 212 is not melted during the laser cutting operation.

However, the insulating, porous ceramic layer 212 has a smaller specific weight than the metallic non-coating portion 111c. Therefore, it is believed that during the laser cutting operation, the insulating, porous ceramic layer 212 floats on the newly formed melted metallic curved portion 111e and the ceramic layer 212 perfectly sticks to the surface of the rigidly hardened, cooled curved portion 111e and remains thereon.

Here, the ceramic layer 212, in one embodiment, has a thickness ranging from approximately (about) 1 μm to approximately (about) 12 μm. In another embodiment, the ceramic layer 212 has a thickness ranging from approximately (about) 2 μm to approximately (about) 10 μm. For example, when the thickness of the ceramic layer 212 is smaller than 1 μm, it was observed that a portion of the surface of the curved portion 111e was exposed to the outside through the ceramic layer 212. In addition, when the thickness of the ceramic layer 212 is greater than 12 μm, the ceramic layer 212 does not float on the surface of the melted curved portion 111e during the laser cutting operation, but is stripped off to the outside for removal. Therefore, the ceramic layer 212 remaining on the surface of the curved portion 111e was not observed.

Therefore, in order to make the ceramic layer 212 remain on the surface of the curved portion 111e, the thickness of the ceramic layer 212 is, in one embodiment, maintained in a range of approximately (about) 1 μm to approximately (about) 12 μm. In addition, if the thickness of the ceramic layer 212 is maintained in the range stated above, high heat resistance is demonstrated and thermal shrinkage can be suppressed.

The ceramic layer 212 may be made of $Al_2O_3$, MgO, $TiO_2$, $Al(OH)_3$, $Mg(OH)_2$, $Ti(OH)_4$ or a combination thereof, which have electrically insulating properties and porosities, but aspects of the present invention are not limited thereto.

An average particle diameter of ceramic particles of the ceramic layer 212 may be in a range of approximately (about) 0.1 μm to approximately (about) 5 μm, for example, in a range of approximately (about) 0.4 μm to approximately (about) 0.8 μm. When the ceramic particles having the average particle diameter in the range stated above are used, uniform coating of the ceramic layer 212 can be achieved.

In addition, the porosity of the ceramic layer 212 may be in a range of 30% by volume to 55% by volume, for example, in a range of 40% by volume to 55% by volume. When the porosity of the ceramic layer 212 is in the range stated above, ion movement can be facilitated, thereby improving battery performance.

Further, the ceramic layer 212 may also be applied to a positive electrode plate as well as a negative electrode plate.

Figure 6A:
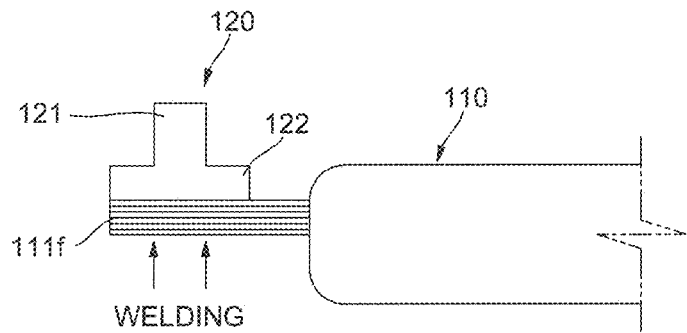
FIGS. 6A and 6B are schematic views illustrating a connection method of a tab and a terminal in a rechargeable battery according to an embodiment of the present invention.
Figure 6B:
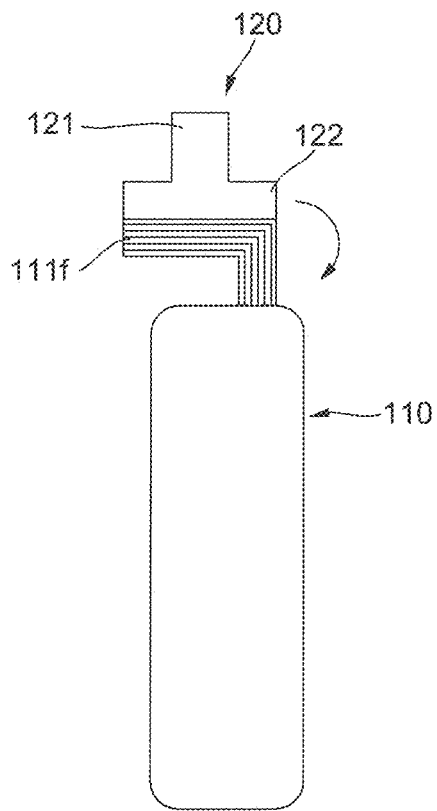

FIGS. 6A and 6B are schematic views illustrating a connection method of a tab and a terminal in a rechargeable battery according to an embodiment of the present invention.

As shown in FIG. 6A, a tab 111f extends from the electrode assembly 110, a lengthwise direction of the tab 111f being the same with a lengthwise direction or winding axis direction of the electrode assembly 110. The tab 111f is relatively wide and planar and may be welded by laser beams directly to the flange 122 that is provided at a bottom end of the terminal pillar 121. Here, the tab 111f may also be welded by resistance welding or ultrasonic welding in addition to the laser beams.

As illustrated in FIG. 6B, the tab 111f may be bent from the terminal 120 in a substantially perpendicular direction. That is to say, the tab 111f may be bent in a substantially "L" shaped manner. Therefore, the winding axis of the electrode assembly 110, the winding axis of the terminal 120 and a tab axis of the tab 111f are roughly parallel or horizontal with each other. Practically, the terminal axis of the terminal 120 and the tab axis of the tab 111f may be connected to each other. That is to say, a top end of the tab axis of the tab 111f may be connected to a bottom end of the terminal axis of the terminal 120.

Figure 7:
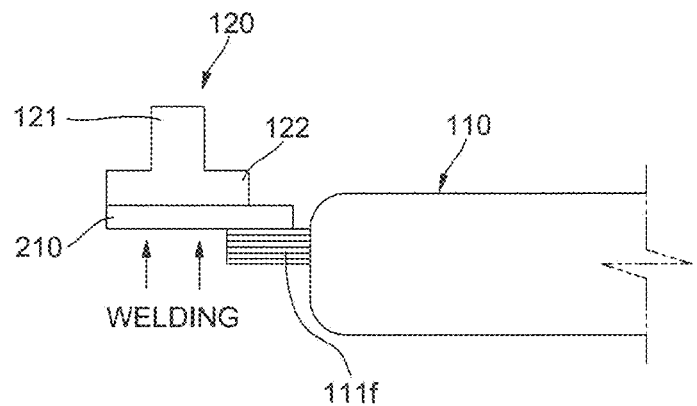
FIG. 7 is a schematic view illustrating a connection method of a tab and a terminal in a rechargeable battery according to another embodiment of the present invention.

FIG. 7 is a schematic view illustrating a connection method of a tab and a terminal in a rechargeable battery according to another embodiment of the present invention.

As illustrated in FIG. 7, a lead 210 tab having a relatively large thickness may be connected to the tab 111f, and the lead 210 may be directly welded by laser beams to the flange 122 provided at a bottom end of the terminal pillar 121. When a plurality of tabs 111f each having a relatively small thickness are directly connected to the terminal 120, it is quite difficult for the plurality of tabs 111f to be simultaneously connected to the terminal 120. Therefore, as described above, the plurality of tabs 111f are first stably connected to the lead 120 by laser beams or ultrasonic energy and the lead 120 is then connected to a terminal, thereby improving reliability in the electrical connection between the terminal 120 and the electrode assembly 110.

Figure 8:
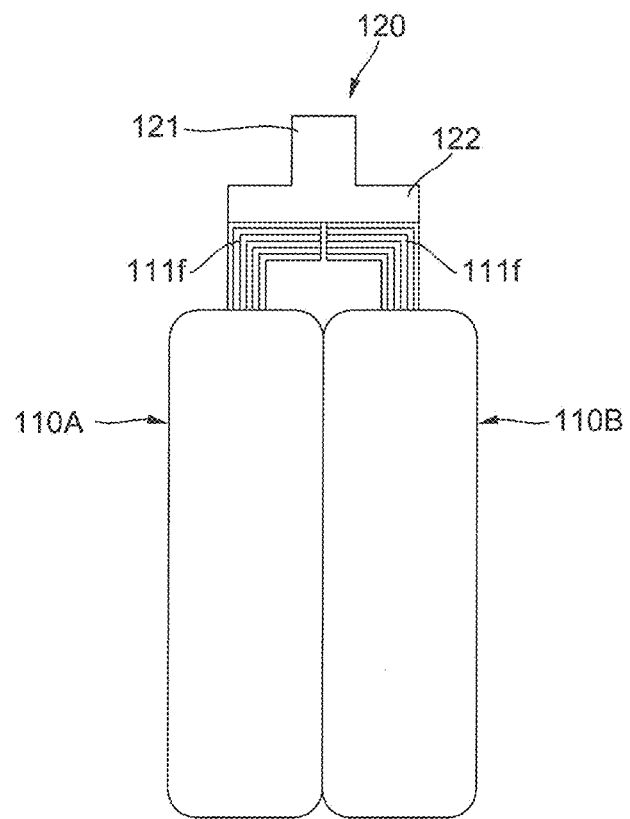
FIG. 8 is a schematic view illustrating a connection method of a tab and a terminal in a rechargeable battery according to still another embodiment of the present invention.

FIG. 8 is a schematic view illustrating a connection method of a tab and a terminal in a rechargeable battery according to still another embodiment of the present invention.

As illustrated in FIG. 8, two electrode assemblies 110A and 110B may be electrically connected to the terminal 120. In more detail, tabs 111f extending from a pair of electrode assemblies 110A and 110B may be electrically connected to the planar flange 122 provided at a bottom portion of terminal pillar 121 of the terminal 120.

Here, the tabs 111f respectively extending from the electrode assemblies 110A and 110B may be bent to be symmetrically or asymmetrically disposed with respect to the terminal 120.

As described above, since at least the pair of electrode assemblies 110A and 110b are directly connected to the one terminal 120 through the tabs 111f, the rechargeable battery having a large capacity while having small internal resistance can be manufactured.

Figure 9:
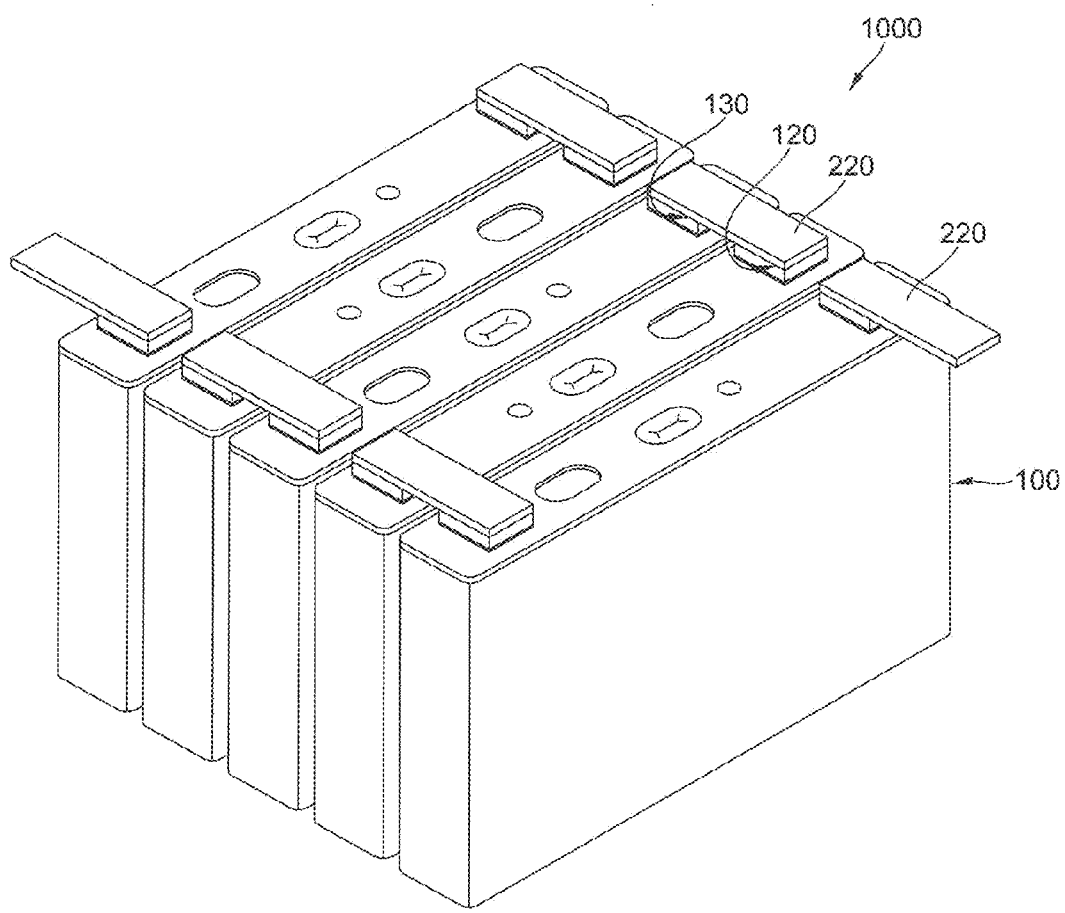
FIG. 9 is a perspective view illustrating an exemplary battery module using a rechargeable battery according to an embodiment of the present invention.

FIG. 9 is a perspective view illustrating an exemplary battery module using a rechargeable battery according to an embodiment of the present invention.

As illustrated in FIG. 9, a plurality of rechargeable batteries 100 are arranged in one line and a plurality of busbars 220 are coupled to the rechargeable batteries 100 arranged in one line, thereby completing a battery module 1000. For example, the first terminal 120 of one of the rechargeable batteries 100 and the second terminal 130 of another of the rechargeable batteries 100 are welded to the busbar 220, thereby providing the battery module 1000 having the plurality of rechargeable batteries 100 connected to each other in series. Here, the busbar 220 may be made of aluminum or an aluminum alloy. Here, the first terminal plate 123 of the first terminal 120 and the second terminal plate 133 of the second terminal 130 may also be made of aluminum or an aluminum alloy, thereby allowing the busbar 220 to be easily welded to the first terminal 120 and the second terminal 130.

Figure 10:
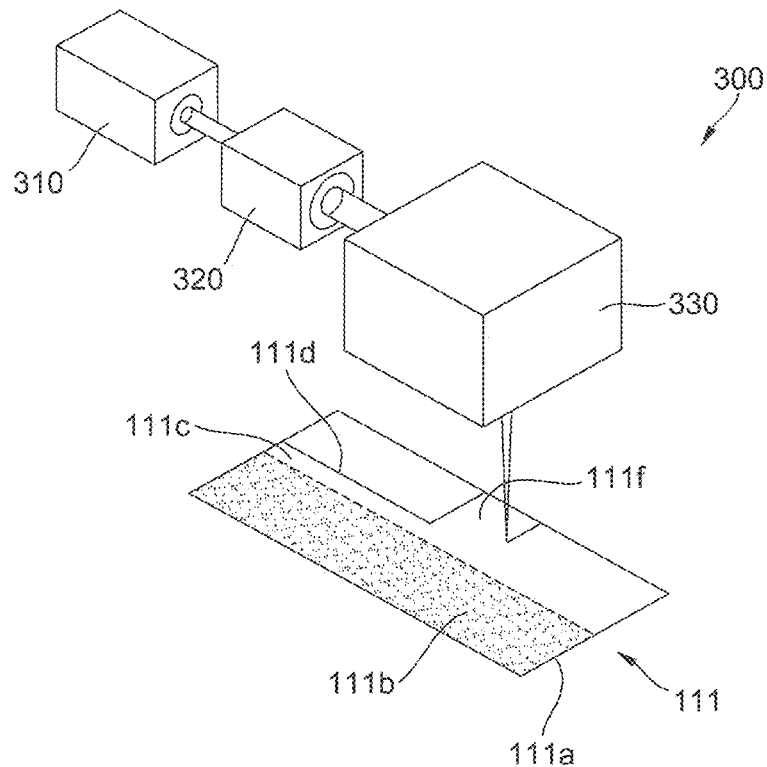
FIG. 10 is a schematic view illustrating a laser cutting system for forming a tab of an electrode plate in a rechargeable battery according to an embodiment of the present invention.
Figure 11A:
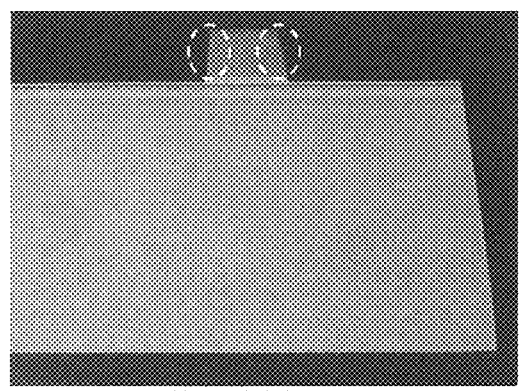
FIGS. 11A to 11D are photographs illustrating planes and sections of a negative electrode plate formed by continuous wave laser beams according to an embodiment of the present invention.
Figure 11B:
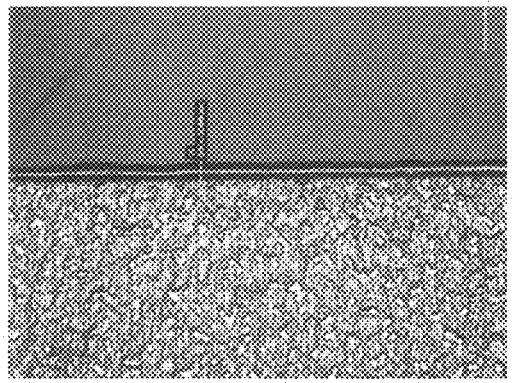
Figure 11C:
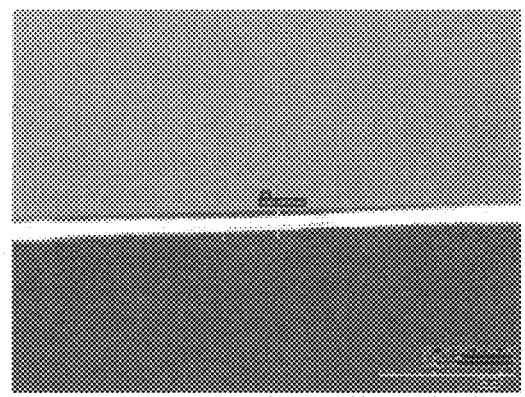
Figure 11D:
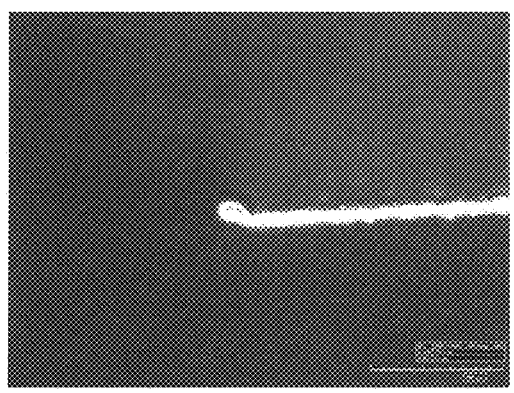

FIG. 10 is a schematic view illustrating a laser cutting system for forming a tab of an electrode plate in a rechargeable battery according to an embodiment of the present invention. Here, the laser cutting system is, for example, of an air cooling type.

As illustrated in FIG. 10, the laser cutting system 300 includes a laser oscillator 310 oscillating laser beams, an expander 320 expanding sizes of laser beams, and a scanner focusing lens unit 330 scanning laser beams and focusing the same onto an electrode plate 111.

Here, the laser beams are based on continuous waves, rather than pulsed waves. To this end, a diode or semiconductor pump single mode continuous wave laser oscillator may be used. Additionally, a general infrared (IR) laser oscillator of carbon dioxide, YAG, helium, neon, etc., may be used. However, the present invention does not limit the kind of a laser oscillator used to those listed herein.

Meanwhile, the electrode plate 111 to be cut may be moved by, for example, roll-to-roll equipment, but aspects of the present invention are not limited thereto.

After the laser cutting system 300 is prepared, the electrode plate 111 is prepared, the electrode plate 111 including the current collector plate 111a, the coating portion 111b formed by coating an electrically active material on the current collector plate 111a, and the non-coating portion 111c formed at the edge of the current collector plate 111a and not coated with the electrically active material.

Next, continuous wave laser beams are irradiated into the non-coating portion 111c by the laser cutting system 300 to form a plurality of cutting portions 111d, thereby forming curved portions along the cutting portions 111d in a thickness direction of the non-coating portion 111c. Here, a plurality of tabs 111f outwardly extending (e.g. extending a predetermined length) from the non-coating portion 111c are formed between the plurality of cutting portions 111d, which is referred to as a notching process, and a tab formed during this process is referred to as a notching tab.

In an example embodiment, when the current collector plate 111a is made of aluminum or an aluminum alloy, the continuous wave laser beams may produce energy in a range of approximately (about) 19 cal/s (80 W) to approximately (about) 119 cal/s (500 W) and may move at a speed of approximately (about) 100 mm/s to approximately (about) 5000 mm/s. Here, when the continuous wave laser beams move, a support member supporting the current collector plate 111a is also moved, so that the support member and the current collector plate 111a may move relative to each other. Alternatively, the support member supporting the current collector plate 111a may be fixed. Instead of moving the continuous wave laser beams, the support member supporting the current collector plate 111a may move. Here, the support member may move at a speed of approximately (about) 100 mm/s to approximately (about) 3000 mm/s.

If the energy of the laser beams is smaller than 19 cal/s, cutting of the non-coating portion may not be performed. If the energy of the laser beams is greater than 119 cal/s, cutting quality may not be further improved. In addition, if the moving speed of the laser beams is smaller than 100 mm/s, quite a long time may be required for cutting, lowering mass productivity. If the moving speed of the laser beams is greater than 5000 mm/s, cutting of the non-coating portion may not be properly performed due to a lack of the energy of the laser beams.

In another example embodiment, when the current collector plate 111a is made of copper or a copper alloy, the continuous wave laser beams may produce energy in a range of approximately (about) 47 cal/s (200 W) to approximately 143 cal/s (600 W) and may move at a speed of approximately (about) 100 mm/s to approximately (about) 9000 mm/s. As described above, when the continuous wave laser beams move, a support member supporting the current collector plate 111a is also moved, so that the support member and the current collector plate 111a may move relative to each other. Alternatively, the support member supporting the current collector plate 111a may be fixed. Instead of moving the continuous wave laser beams, the support member supporting the current collector plate 111a may move. Here, the support member may move at a speed of approximately (about) 100 mm/s to approximately (about) 3000 mm/s.

If the energy of the laser beams is smaller than 47 cal/s, cutting of the non-coating portion may not be performed. In addition, due to characteristics of the system, the energy of the laser beam is unlikely to exceed 143 cal/s.

In another example embodiment, when the current collector plate 111a is made of copper or a copper alloy, the continuous wave laser beams may produce energy in a range of approximately (about) 47 cal/s (200 W) to approximately 143 cal/s (about) (600 W) and may move at a speed of approximately (about) 100 mm/s to approximately (about) 9000 mm/s. As described above, when the continuous wave laser beams move, a support member supporting the current collector plate 111a is also moved, so that the support member and the current collector plate 111a may move relative to each other. Alternatively, the support member supporting the current collector plate 111a may be fixed. Instead of moving the continuous wave laser beams, the support member supporting the current collector plate 111a may move. Here, the support member may move at a speed of approximately (about) 100 mm/s to approximately (about) 3000 mm/s.

If the energy of the laser beams is smaller than 47 cal/s, cutting of the non-coating portion may not be performed. In addition, due to characteristics of the system, the energy of the laser beam is unlikely to exceed 143 cal/s.

If the moving speed of the laser beams is smaller than 100 mm/s, the energy may accumulate, lowering cutting quality (that is, generating a large amount of dross). If the moving speed of the laser beams is greater than 9000 mm/s, cutting of the non-coating portion may not be properly performed due to a lack of the energy of the laser beams.

The output energy of the laser beams may further be increased. In this case, a water cooling type laser system, instead of the air cooling type laser system of the present embodiment, may be used. However, since most of battery components are vulnerable to moisture or humidity, as well known in the art, exposure to the moisture or humidity should be avoided during the manufacture of batteries, and the water cooling type laser system may not be readily employed, which does not suggest that the use of the water cooling type laser system may be completely precluded from use in the present invention.

Once the problem associated with moisture or humidity is solved, the water cooling type laser system producing relatively large laser beam energy may be employed in the manufacture of batteries.

The energy intensity and moving speed of the laser beams based on the air cooling type laser system are provided only for a better understanding of the present embodiment. If the energy intensity of the laser beams is changed, like in the water cooling type laser system, the energy intensity and moving speed of the laser beams may also be changed accordingly.

The laser beam energy for a copper-based current collector plate is greater than that for an aluminum-based current collector plate because copper has a higher melting point, thermal conductivity and reflectivity (based on IR wavelength) than aluminum. That is to say, the higher the melting point, thermal conductivity and reflectivity, the lower the cutting efficiency. Accordingly, the laser beam energy should be increased through the use of a copper-based current collector plate.

In addition, the moving speed of the laser beam for the aluminum-based or copper-based current collector plate may be adjusted within the range of moving speed stated above according to the specific range of laser beam energy.

In addition, the laser beams may have a spot size in a range of approximately (about) 10 μm to approximately (about) 50 μm. As described above, since the thickness of the current collector plate is in the range of approximately (about) 6 μm to approximately (about) 12 μm, the current collector plate can be cut with a uniform width by the laser beams having a spot size in the range stated above. However, if the spot size of the laser beam is smaller than approximately (about) 10 μm, the depth of processing is also reduced, so that cutting is not properly performed. If the spot size of the laser beam is greater than approximately (about) 50 μm, a cutting region becomes unnecessarily increased, lowering cutting quality.

Example 1

Figure 14A:
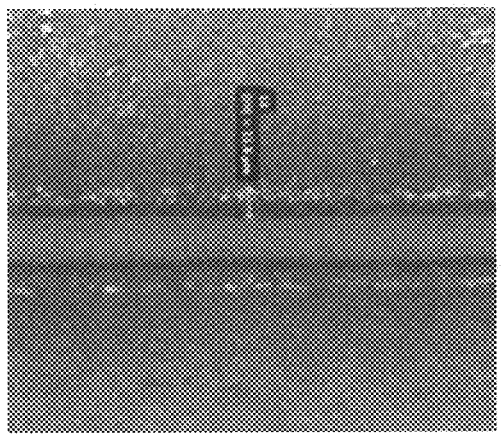
FIGS. 14A and 14B are photographs illustrating planes and sections of a negative electrode plate formed by pulsed wave laser beams.
Figure 14B:
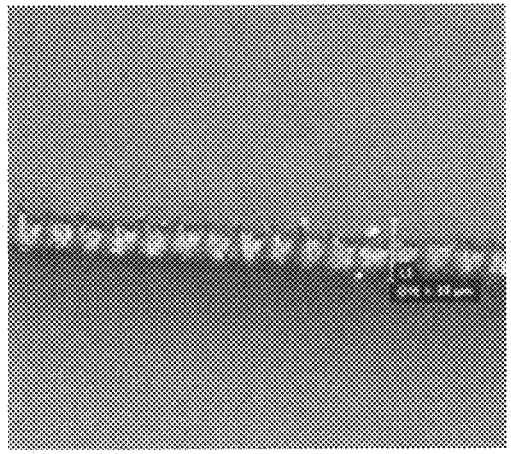

A copper current collector plate for a negative electrode plate having a thickness of approximately (about) 8 μm to approximately (about) 12 μm for use in a rechargeable battery was used as a work-piece. In addition, the copper current collector plate for the negative electrode plate was cut using an IR-CW laser having an output capacity of 72 cal/s (300 W) in processing conditions of 40 μm in beam size and 4000 mm/s in processing speed. FIGS. 11A to 11D illustrate photographs of surfaces and sections of the copper current collector plate cut in the above-mentioned conditions. Referring to FIGS. 11A to 11D, bead-type uniform sectional shapes of cutting portions were observed, compared to photographs of FIGS. 14A and 14B illustrating experimental data of Comparative Example 1.

That is to say, the cutting portion and the curved portion formed using continuous wave laser beams have roughly round surfaces and roughly circular or oval sections perpendicular to a lengthwise direction (see FIG. 11D), thereby preventing or substantially preventing a separator from being damaged by the cutting portion and the curved portion.

Example 2

Figure 12A:
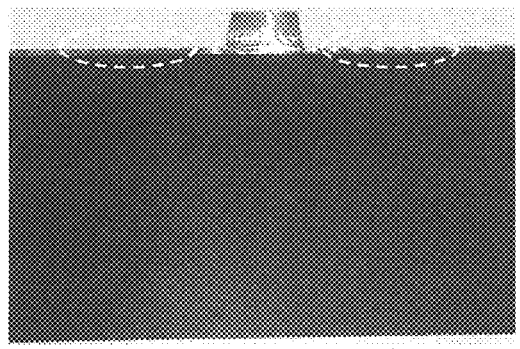
FIGS. 12A to 12C are photographs illustrating planes and sections of a positive electrode plate formed by continuous wave laser beams according to an embodiment of the present invention.
Figure 12B:
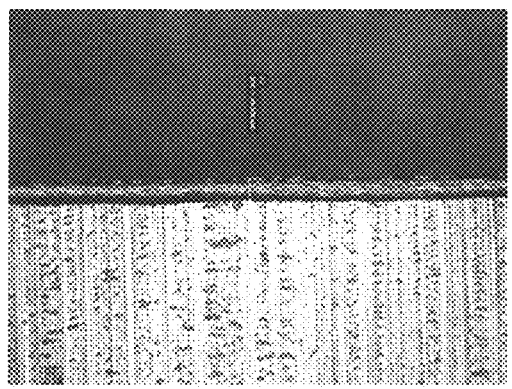
Figure 12C:
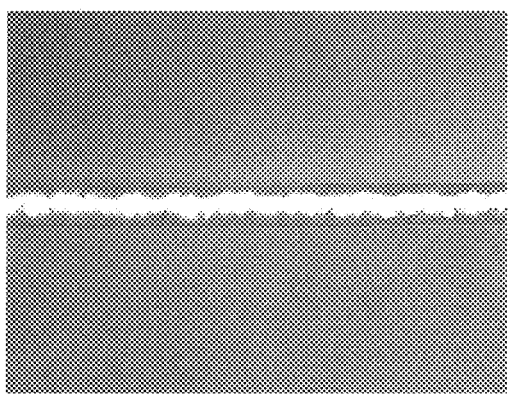
Figure 15A:
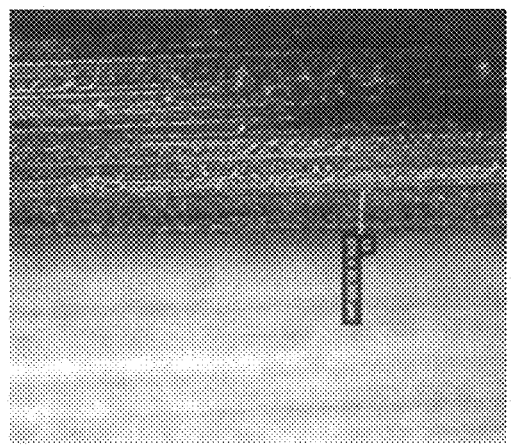
FIGS. 15A and 15B are photographs illustrating planes and sections of a positive electrode plate formed by pulsed wave laser beams.
Figure 15B:
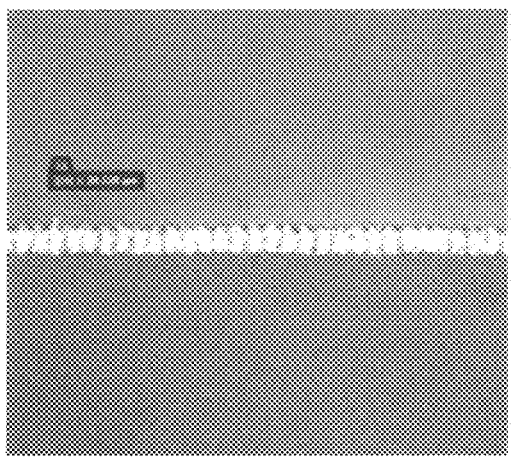

An aluminum current collector plate for a positive electrode plate having a thickness of approximately (about) 8 μm to approximately (about) 12 μm for use in a rechargeable battery was used as a work-piece. In addition, the copper current collector plate for the positive electrode plate was cut using an IR-CW laser having an output capacity of 19 cal/s (80 W) in processing conditions of 40 μm in beam size and 1000 mm/s in processing speed. FIGS. 11A to 11D illustrate photographs of surfaces and sections of the copper current collector plate cut in the above-mentioned conditions. Referring to FIGS. 12A to 12C, bead-type uniform sectional shapes of cutting portions were observed, compared to photographs of FIGS. 15A and 15B illustrating experimental data of Comparative Example 2.

In FIG. 12C, the cutting portion and the curved portion appear to have irregular surfaces in a lengthwise direction. However, the irregular surfaces have practically round shapes having a constant curvature, thereby preventing or substantially preventing a separator from piercing the cutting portion and the curved portion. In other words, the lengthwise surfaces of the cutting portion and the curved portion have roughly "sine waveforms or cosine waveforms", that is, round surfaces, thereby preventing or substantially preventing the separator from being damaged.

Example 3

Figure 13A:
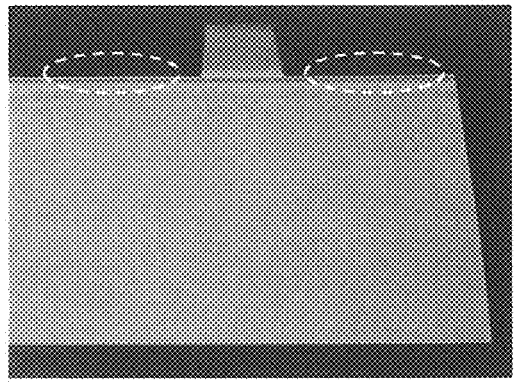
FIGS. 13A to 13C are photographs illustrating planes and sections of a negative electrode plate formed by continuous wave laser beams according to another embodiment of the present invention.
Figure 13B:
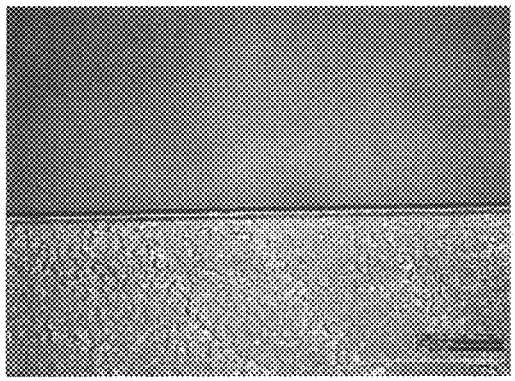
Figure 13C:
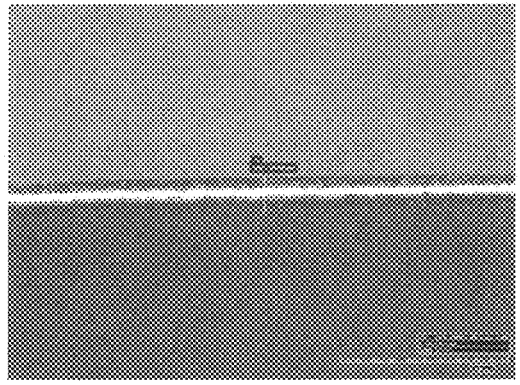

A copper current collector plate for a negative electrode plate having a thickness of approximately (about) 8 μm to approximately (about) 12 μm for use in a rechargeable battery was used as a work-piece. In addition, the copper current collector plate for the negative electrode plate was cut using an IR-CW laser having an output capacity of 72 cal/s (300 W) in processing conditions of 40 μm in beam size and 4000 mm/s in processing speed. The cutting experiment was performed on the prepared work-piece in the same manner as in Example 1, except that the processing speed was changed into 1000 mm/s. FIGS. 13A to 13C illustrate photographs of surfaces and sections of the copper current collector plate cut in the above-mentioned conditions. As observed from FIGS. 13A to 13C, cutting portions had bead-type uniform sectional shapes, like in Example 1.

Comparative Example 1

A copper current collector plate for a negative electrode plate having a thickness of approximately (about) 8 μm to approximately (about) 12 μm for use in a rechargeable battery was used as a work-piece. In addition, the copper current collector plate for the negative electrode plate was cut using a UV pulse laser having an output capacity of 19 W in processing conditions of 100 kHz in pulse frequency, 10 ns in pulse width, 0.19 mJ in pulse energy, 30 μm in beam size and 1000 mm/s in processing speed. FIGS. 14A and 14B illustrate photographs of surfaces and sections of the negative electrode current collector plate cut in the above-mentioned conditions. As observed from FIGS. 14A and 14B, cutting portions had sharp, keen-edged burr-like sectional shapes. The burr may damage or tear a separator interposed between a positive electrode plate and the negative electrode plate, causing an electric short between the positive electrode plate and the negative electrode plate. In addition, the sharp, keen-edged burr may be easily stripped off from the electrode plate due to an external shock, so that a metallic foreign material may be generated in an electrode assembly.

Comparative Example 2

An aluminum current collector plate for a positive electrode plate having a thickness of approximately (about) 8 μm to approximately (about) 12 μm for use in a rechargeable battery was used as a work-piece. In addition, the aluminum current collector plate for the positive electrode plate was cut using a UV pulse laser having an output capacity of 8.5 W in processing conditions of 100 kHz in pulse frequency, 40 ns in pulse width, 0.085 mJ in pulse energy, 30 μm in beam size and 1000 mm/s in processing speed. FIGS. 15A and 15B illustrate photographs of surfaces and sections of the positive electrode current collector plate cut in the above-mentioned conditions. As observed from FIGS. 15A and 15B, cutting portions had sharp, keen-edged burr-like sectional shapes.

Example 4

Figure 16A:
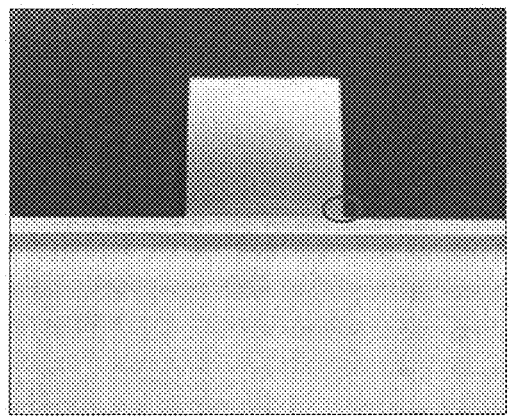
FIGS. 16A to 16C are photographs illustrating planes and sections of a negative electrode plate formed by continuous wave laser beams according to yet another embodiment of the present invention.
Figure 16B:
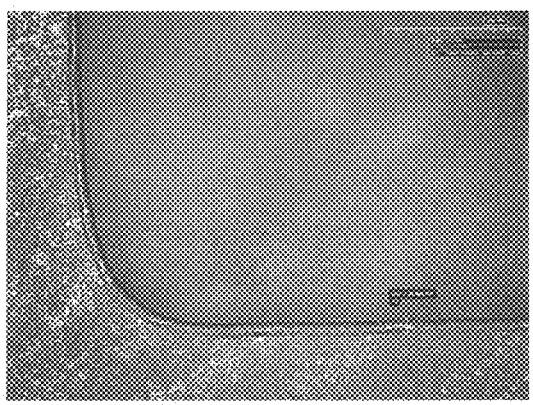
Figure 16C:
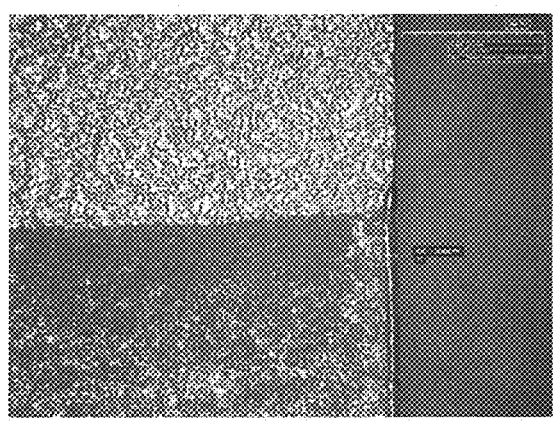

A copper current collector plate for a negative electrode plate having a thickness of approximately (about) 6 μm to approximately (about) 12 μm for use in a rechargeable battery was used as a work-piece, the copper current collector plate having a coating portion and a non-coating portion formed thereon and a ceramic layer formed on the coating portion and the non-coating portion. The cutting experiment was performed on the prepared copper current collector plate was cut using an IR-CW laser having an output capacity of 72 cal/s (300 W) in processing conditions of 40 μm in beam size and 4000 mm/s in processing speed. FIGS. 16A to 16C illustrate photographs of surfaces of the copper current collector plate cut in the above-mentioned conditions. As observed from FIGS. 16A to 16C, cutting portions had bead-type sectional shapes and were covered by the ceramic layer. In particular, as illustrated in FIG. 16B, the bead-type sectional surface positioned on a region with the previously formed ceramic layer is completely covered by the ceramic layer. In addition, as illustrated in FIG. 16C, the bead-type sectional surface positioned on a region without the previously formed ceramic layer is not covered by the ceramic layer.

While the rechargeable battery and the manufacturing method of the present invention have been particularly shown and described with reference to exemplary embodiments thereof, it will be understood by those of ordinary skill in the art that various changes in form and details may be made therein without departing from the spirit and scope of the present invention as defined by the following claims and their equivalents. It is therefore desired that the present embodiments be considered in all respects as illustrative and not restrictive, reference being made to the appended claims rather than the foregoing description to indicate the scope of the present invention.

What is claimed is:

1. A rechargeable battery comprising:
   a case;
   an electrode assembly in the case; and
   a terminal electrically connected to the electrode assembly and passing through the case,
   wherein the electrode assembly comprises
      an electrode plate comprising a current collector plate,
      a coating portion having an electrically active material coated on the current collector plate,
      a non-coating portion formed at an edge of the current collector plate and not coated with the electrically active material,
      a cutting portion inwardly formed from the non-coating portion, and
      a curved portion formed along the cutting portion in a thickness direction of the non-coating portion.

2. The rechargeable battery of claim 1, wherein the curved portion has a circular or oval section perpendicular to a lengthwise direction of the cutting portion.

3. The rechargeable battery of claim 1, wherein each of the cutting portion and the curved portion is bent at least one time.

4. The rechargeable battery of claim 1, wherein each of the cutting portion and the curved portion is "u" shaped.

5. The rechargeable battery of claim 1, wherein the cutting portion comprises a plurality of cutting portions spaced apart from each other, and a tab outwardly extends from the non-coating portion between a pair of spaced-apart cutting portions among the plurality of cutting portions and is electrically connected to the terminal.

6. The rechargeable battery of claim 5, wherein the curved portion is at opposite ends of the tab.

7. The rechargeable battery of claim 1, wherein a thickness of the curved portion is 1 to 4 times greater than a thickness of the current collector plate.

8. A rechargeable battery comprising:
a case;
an electrode assembly in the case; and
a terminal electrically connected to the electrode assembly and passing through the case,
wherein the electrode assembly comprises:
an electrode plate comprising a current collector plate,
a coating portion having an electrically active material coated on the current collector plate,
a non-coating portion formed at an edge of the current collector plate and not coated with the electrically active material,
a cutting portion inwardly formed from the non-coating portion, and
a curved portion formed along the cutting portion in a thickness direction of the non-coating portion, and
wherein the curved portion is covered by a ceramic layer.

9. A manufacturing method of a rechargeable battery, the manufacturing method comprising:
preparing an electrode plate including a current collector plate, a coating portion formed by coating an electrically active material on the current collector plate, and a non-coating portion formed at an edge of the current collector plate and not coated with the electrically active material; and
forming a cutting portion by irradiating continuous wave laser beams into the non-coating portion to form a curved portion along the cutting portion in a thickness direction of the non-coating portion.

10. The manufacturing method of claim 9, wherein when the current collector plate is made of aluminum or an aluminum alloy, the continuous wave laser beams have energy ranging from 19 cal/s to 119 cal/s and a moving speed ranging from 100 mm/s to 5000 mm/s.

11. The manufacturing method of claim 9, wherein when the current collector plate is made of copper or a copper alloy, the continuous wave laser beams have energy ranging from 47 cal/s to 143 cal/s and a moving speed ranging from 100 mm/s to 9000 mm/s.

* * * * *